Sept. 28, 1943. O. JOHNSON 2,330,367
DELIVERY RECEPTACLE
Filed March 13, 1942 2 Sheets-Sheet 1

Inventor
Oscar Johnson
by David L. Wood
Attorney

Sept. 28, 1943.  O. JOHNSON  2,330,367
DELIVERY RECEPTACLE
Filed March 13, 1942   2 Sheets-Sheet 2

Inventor
Oscar Johnson
by Dann L. Wood
Attorney

Patented Sept. 28, 1943

2,330,367

UNITED STATES PATENT OFFICE 2,330,367

DELIVERY RECEPTACLE

Oscar Johnson, Hadley, N. Y.

Application March 13, 1942, Serial No. 434,471

6 Claims. (Cl. 232—41)

My invention more particularly relates to a delivery receptacle which provides for the safe delivery of material to a consumer and while particularly intended to provide for the delivery of milk or cream in a safe and sanitary condition, it will of course be understood that it may be used for the safe delivery of other materials without being placed outside of the home and without the possibility of the milk or other material being exposed where animals such as cats and dogs may lick the milk from the lip of the bottle or otherwise render the material unsanitary.

My present invention is a continuation in part of my application Serial No. 287,045 which was filed in the United States Patent Office July 28, 1939, for Delivery receptacle.

One of the objects of my invention is the provision of a receptacle of the foregoing character which may be placed in an opening in the wall of a home. The receptacle has a service door on one side through which milk or other material may be delivered to the receptacle and a consumer's door through which the material may be removed therefrom.

While the receptacle embodying my invention is particularly intended to be built into the walls of a home, it is not limited to such use as it may, if desired, be secured to a post or other fixed object outside of the home.

Another object of my invention is the provision of an indicator assembly provided with indicating members which are movable from within the receptacle to a position without the receptacle and which indicate the amount of milk or other material desired by the consumer.

A further object of my invention is the provision of means for retaining the indicating members in exposed positions only when the service door of the receptacle is in closed position.

A further object of my invention is the provision of means operable in response to the actuating means for the indicating members for unlocking the service door of the receptacle.

A further object of my invention is the provision of means for unlocking the indicating members and permitting their withdrawal from their exposed positions to a position within the receptacle in case the incorrect indicating members have been exposed.

A still further object of my invention is the provision of means for releasing the indicating members from their indicating positions to their concealed positions within the receptacle in response to the movement of the service door to closed position.

Other objects of my invention will appear in the specification and will be particularly pointed out in the claims.

A service door is provided which extends across a portion of the front of the receptacle through which milk, cream or other desired material may be delivered to the receptacle and a consumer's door is provided on the rear side of the receptacle which preferably extends across the entire receptacle and through which milk, cream or other articles may be removed from the receptacle.

My invention will best be understood by reference to the accompanying drawings in which I have illustrated a preferred embodiment of my invention and in which—

Like reference characters indicate like parts throughout the drawings.

Figure 1:
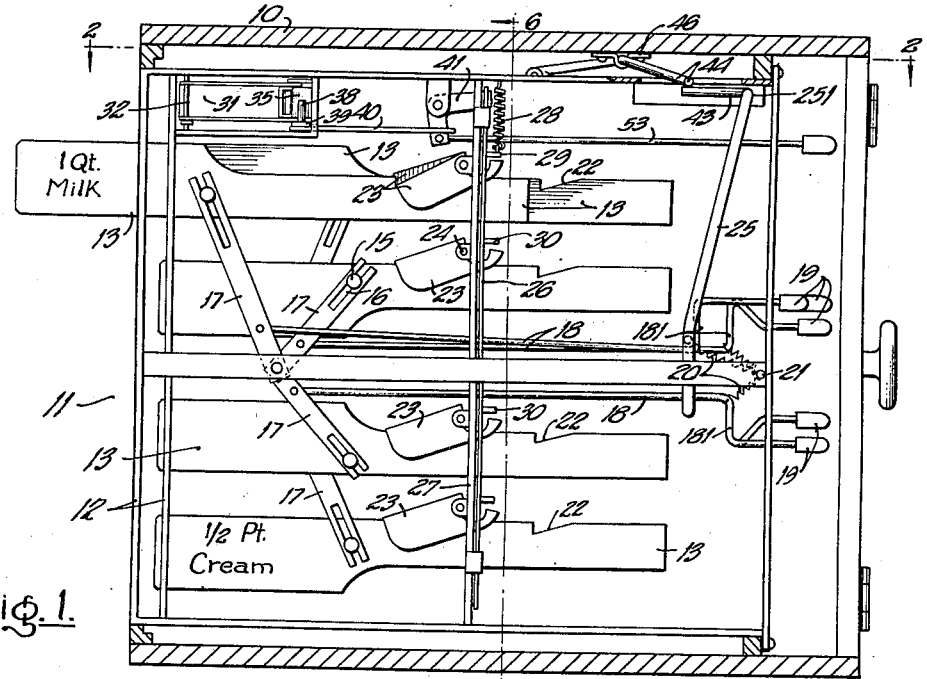
Fig. 1 is a side view of the device embodying my invention with the side of the receptacle removed.

Referring to the drawings in which I have illustrated a preferred embodiment of my invention, 10 is the receptacle which may be formed of wood, metal or other suitable material suitably secured together. In one side of the receptacle is removably positioned an indicator assembly illustrated generally at 11 and comprising a suitable frame 12, preferably rectangular in form, which may be formed of zinc or other suitable material and comprising a plurality of indicator plates 13 the front ends of which are preferably provided with letters which indicate the material which it is desired should be delivered, such as "Milk," "Cream," etc. When the device is used for the delivery of milk and cream, the two upper tiers or banks of indicator plates may conveniently bear letters for "Milk" and the two lower banks of indicators may bear the letters "Cream," although it will of course be understood that the delivery receptacle embodying my invention may likewise be used for the safe delivery of bread, cakes, or any articles which are to be delivered in a sanitary condition. Likewise it will be understood that while I have shown two banks or tiers of indicating members for milk and cream, the upper and lower banks are duplicates, or practically so, and the device could be divided horizontally along the middle portion thereof so that it would be only about half as large as the device illustrated.

In accordance with my invention, means are provided for projecting the respective indicating plates 13 through slots or openings 14 in the front of the receptacle and registering slots in the frame of the indicator assembly. In the embodiment of my invention illustrated each plate is provided with a headed stud 15. A given plate or indicating member 13 is moved outwardly to indicating position by a handle 19 on the rod 18. The inner end of the rod is attached to an arm 17 which is pivotally mounted on a longitudinally extending member of the frame 12. The outer end of the arm 17 is provided with a slot in which is received a stud 15 which is mounted on the plate 13. When a rod 18 is moved inwardly by its handle 19 the arm 17 is rotated about its pivot and moves the stud 15 and the plate 13 on which it is mounted outwardly through its opening in the frame and the receptacle 10. An operating rod 18 extends from the rear of the casing, as best indicated in Fig. 1, and is pivotally connected to the arm 17, the front end of the rod preferably being bent (in a manner not illustrated) to provide a pivotal connection between the forward end of the operating rod 18 and the arm 17. The rear ends of the operating rods 18 may be bent as indicated in the central portion of Fig. 1. The inner or rear ends of the rods 18 may conveniently be provided with handles 19 as best indicated in Fig. 1. Retracting springs 20 are connected to the respective operating rods 18 and to a stationary part 21 of the casing.

Figures 11, 12:
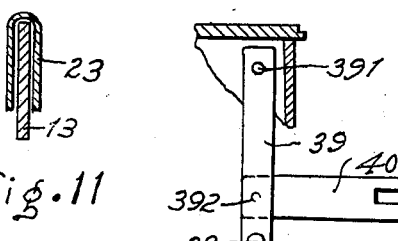
Fig. 11 is a sectional view through one of the detents resting on an indicator plate.
Fig. 12 is a sectional plan view of the actuating member 39 and the link 40, provided with a slot, connected thereto.

Each of the plates 13 is provided with a notch 22, preferably on its upper side, in which is received the upper and forward edge of a U-shaped detent or retaining member 23 (Figs. 1 and 11) pivotally mounted as at 24 (Fig. 1) on a bracket attached to the frame. The two legs of the member 23 are positioned on opposite sides of the associated plate or indicating member 13, as viewed in Fig. 11, and the forward edge thereof drops by gravity into the notch 22 of the associated plate when the latter is moved outwardly to indicating position and thus locks the plate or indicating member in indicating position.

Figure 3:
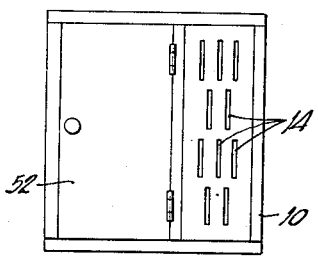
Fig. 3 is a front view (on a smaller scale) of the receptacle showing the hinges for the door at the front and the openings through which the indicating members are projected.
Figure 4:
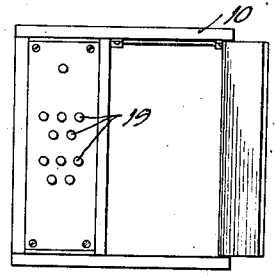
Fig. 4 is a rear view of the receptacle showing the consumer's door partially open.
Figure 10:
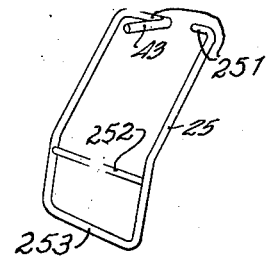
Fig. 10 is a perspective view of a yoke member.
Figure 5:
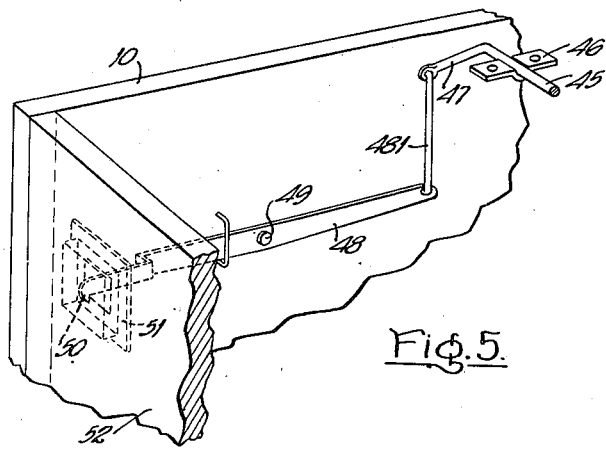
Fig. 5 is a fragmentary perspective view illustrating the locking mechanism for the service door and a portion of the mechanism by which the same is operated.

If a quart of milk is desired, one of the plates 13 which is lettered "Milk" is projected through the associated opening 14 (Fig. 3), the pivotally mounted retaining member 23, the forward end of which is biased downwardly by gravity, engages the notch 22 and retains the indicating member in exposed position until it is released by the movement of the service door to closed position by mechanism which will now be described. The detent or retaining members 23 are released by a universal member 26, shown in the form of a plate, which is movably mounted in a vertical direction on the face of a stationary plate 27 which may be secured to the top and the bottom of the receptacle 10.

The universal plate 26 is normally retained in elevated position by a spring 28 (Fig. 1) which is attached at its upper end to the top of the frame 12 and at its lower end to a flange 29 with which the universal plate 26 is provided and which is engageable with the rear end of the detent 23. Similar flanges 30 are secured to the universal plate 26 and are associated with the rear ends of the other detents or retaining members 23 as best indicated in Fig. 1 and when depressed by the associated flange 30 tilts the detent 23 and releases the same.

In accordance with my invention means are provided, which are operable in response to the closing of the service door, for releasing each of the detents 23 thereby restoring the indicating members to their concealed positions within the receptacle.

Figure 7:
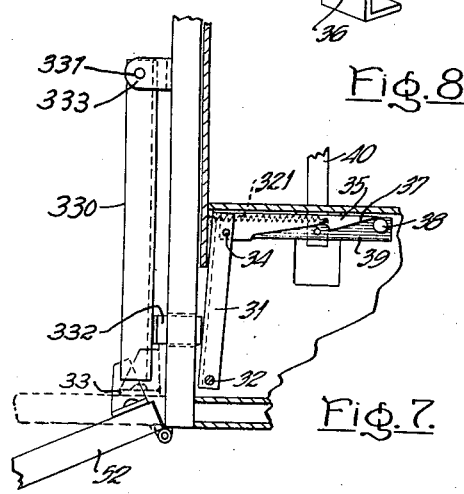
Fig. 7 is a sectional plan view illustrating the mechanism by which the indicator plates are released from their indicating position.

In the embodiment of my invention illustrated, a vertically disposed channel plate 31 is pivotally mounted at 32 on the frame near the upper left hand corner of the unit, as best illustrated in Figs. 1 and 7. The plate 31 is actuated by a lug 33 mounted on the front service door. The lug 33 engages a channel member 330 pivotally mounted at 331 on a bracket 333, which member is provided on its back, as by welding, with a bracket 332 which engages the member 31.

Figure 6:
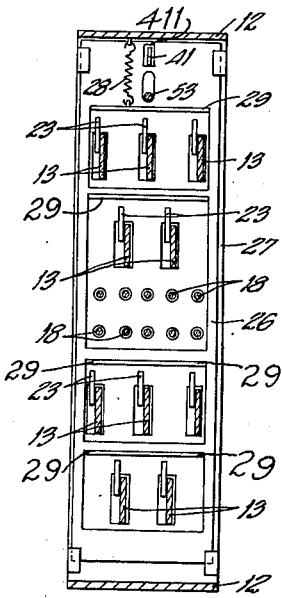
Fig. 6 is a front elevation of the releasing mechanism for the indicator plates.
Figure 8:
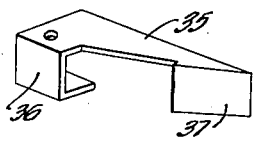
Fig. 8 is a perspective view of the trigger release for the indicating mechanism.
Figure 9:
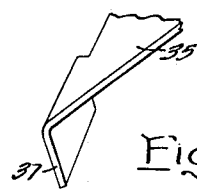
Fig. 9 is a fragmentary perspective view illustrating the release shown in Fig. 8 from the opposite side thereof.

When the door is closed the lug 33 engages one end of the channel member 330 and moves the bracket 332 attached thereto against the plate 31. The movement of the latter moves the end of the arm or member 35 which is pivoted thereto to the right, as viewed in Fig. 7. The cam 37 which is carried by the plate or member 35 (Fig. 8) is moved behind the pin 38, as viewed in Fig. 7, thereby forcing the pin and the end of the plate 39 on which it is mounted to the left as viewed in Fig. 12. The link 40 which is pivotally connected to the plate or arm 39 is also forced to the left and the bell crank 41 (Fig. 1) one arm of which is received in the slot 401 of the link 40 (Fig. 12) is rotated clockwise as viewed in Fig. 1. The other arm of the bell crank 31 which is received in a slot 411 in the universal plate 26 (Fig. 6) engages the bottom of the slot and depresses the universal plate against the action of the spring 28. The flanges 29 on the universal plate (Fig. 1) engage the associated rear ends of the detents 23 and lift the forward ends of such of the detents as may engage notches 22 in the upper edges of the projected plates, thereby releasing the indicating members and permitting the springs 20 to return the same to their concealed positions within the casing. When the pin 38 rides off the cam 37, the pin is released and returns to the right as viewed in Fig. 12 under the influence of the spring 28 which is connected to the universal plate 26, it being remembered that the spring 28 was placed under tension by the clockwise movement of the bell crank 41 and tension therein maintained by the detent (or detents) 23 which engages a notch 22. The return of the universal plate to its elevated position rotates the bell crank 41 anticlockwise and returns the link 40 and the plate 39 to which it is attached and the pin 38 to their original positions.

In accordance with my invention, means are provided for unlocking the service door when any of the indicating members are operated.

Figure 2:
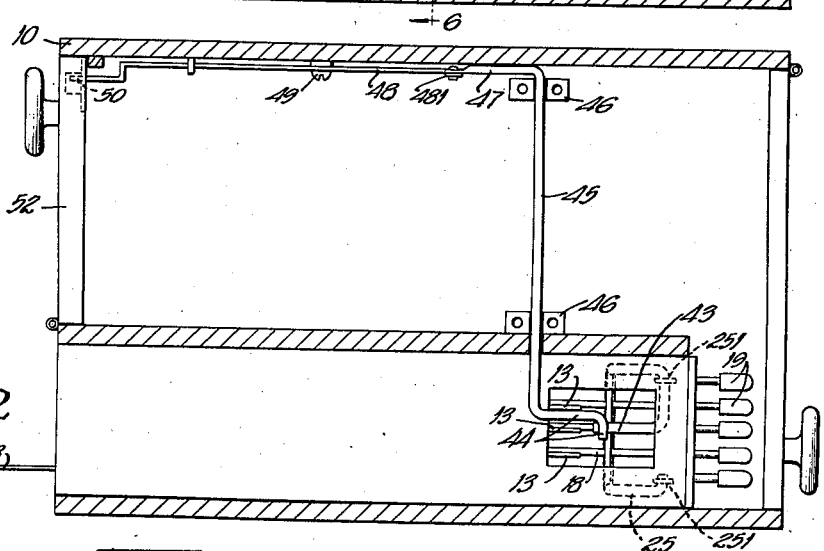
Fig. 2 is a partial plan view of the receptacle with the top removed.

In the embodiment of my invention illustrated, each of the operating rods 18 is provided with an upwardly or downwardly extending portion 131, as shown in Fig. 1. A yoke 25 in the form of a U-shaped member is pivoted at its upper ends, as at 251, so that the lower transverse members 252 and 253 end thereof extends in front of all of the upwardly or downwardly extending portions 131 of the bars 18. When any one of the bars is moved forwardly therefore in order to project an indicating member through one of the openings, the yoke 25 is necessarily tilted about the pivots 251. One end of the yoke is provided with an extension 43 (Fig. 2) which extends beneath an arm 44 of the rod 45 which extends transversely of the receptacle and preferably at the upper side thereof, as best shown in Fig. 2. The rod 45 is secured in position by suitable clips 46 secured to the cover of the receptacle. The free end of the rod 45 is provided with a laterally extending arm 47. An arm 48 is pivoted as at 49 to the inner side of the box or receptacle and the outer end thereof is provided with a latch 50 that is normally retained behind a keeper 51 secured on the inner side of the service door 52. To the opposite end of the arm 48 is attached a link 481 which extends to the end of the arm 47.

When any of the indicating rods therefore which are attached to the indicating plates is moved to the left to indicating position, as viewed in Fig. 1, the yoke 25 is tilted, and rocks the transversely extending shaft 45 and lowers the link 481 and tilts the arm 48 to its door-releasing position.

In accordance with my invention, means are provided for returning any of the indicating members which have, by mistake, been set in indicating position to their normally concealed positions.

In the embodiment of my invention here illustrated, a rod 53 extends from the rear of the housing and is connected to one arm of the bell crank 41 and when moved to the left, as viewed in Fig. 1, depresses the universal releasing plate 26 in the manner heretofore described and returns any indicating member to its concealed position within the receptacle.

It will be noted that the indicating members are projected outwardly in a straight line which permits the openings within the receptacle through which the indicating members pass to be of substantially the same dimensions as the indicating member itself. The openings therefore are not unnecessarily large and there is no possibility of a lateral or vertical movement of the indicating member.

While I have described my invention in its preferred embodiment, it is to be understood that the words which I have used are words of description rather than of limitation. Hence, changes within the purview of the appended claims may be made without departing from the true scope and spirit of my invention in its broader aspects.

What I claim is:

1. In a device of the character described, a housing provided with an opening, a normally concealed indicating member formed on its upper side with a notch, means for projecting said member outwardly through said opening to indicating position, a tiltable locking member engageable with said notch on the movement of said indicating member to indicating position, a service door through which articles may be inserted in said housing and means operable in response to the closing of said service door for tilting said tiltable member out of said notch and thereby releasing said indicating member from its exposed position.

2. In a device of the character described, a housing provided with a service door normally locked in closed position, said housing being provided with an opening, an indicating member normally concealed within said housing, means whereby said indicating member may be moved outwardly through said opening to indicating position, means for locking said indicating member in indicating position, means operable in response to the movement of said door to closed position for unlocking said indicating member, and means for moving said indicating member when unlocked to normally concealed position within said housing.

3. In a device of the character described, a housing provided with a normally locked service door, an indicating member normally concealed within said housing, means for moving said member outwardly through said opening to indicating position, means opening concurrently with the movement of said indicating member to indicating position for unlocking said service door, means for locking said indicating member in indicating position, means responsive to the movement of said service door to closed position for operating said locking means thereby to unlock said indicating member and means for moving said indicating member, when unlocked, inwardly to concealed position.

4. In a device of the character described, a housing provided with an opening, a normally concealed indicating member comprising a plate formed on the upper side thereof with a notch, means for projecting said indicating member through said opening, a tiltable member engageable with said notch and adapted to drop by gravity into said notch on the outward movement of said indicating member and thereby locking said indicating member in exposed position.

5. In a device of the character described, a housing having a service door and provided with an opening, a normally concealed indicating member comprising a normally vertically disposed plate formed on its upper side with a notch, means for projecting said indicating member through said opening, a tiltable member engageable with said notch and adapted to drop by gravity into said notch on the outward movement of said indicating member thereby locking said indicating member in exposed position and means operable in response to the closing of said service door for tilting said tiltable member out of said notch and thereby releasing said member from said notch and means for withdrawing said indicating member into said housing when released.

6. In a device of the character described, a housing provided with a normally locked service door and with an opening, a normally concealed indicating member disposed within said housing, means for moving said indicating member outwardly through said opening to an indicating position, means operable in response to the movement of said service door to closed position and of said indicating member to exposed position for locking said indicating member in indicating position, and means operable by the mechanism which moves said indicating member to indicating position for unlocking said service door.

OSCAR JOHNSON.